United States Patent [19]
Hashimoto et al.

[11] Patent Number: 5,695,425
[45] Date of Patent: Dec. 9, 1997

[54] OUTER TOOTH PROFILE OF PLANETARY GEAR APPARATUS

[75] Inventors: Masataka Hashimoto; Hong You Wang, both of Tsu, Japan

[73] Assignee: Teijin Seiko Co., Ltd., Osaka, Japan

[21] Appl. No.: 577,379

[22] Filed: Dec. 22, 1995

[30] Foreign Application Priority Data

Jan. 6, 1995 [JP] Japan .................... 7-000436

[51] Int. Cl.$^6$ .................. F16H 1/32; F16H 55/08; F16H 55/10
[52] U.S. Cl. .................. 475/180; 475/168; 74/462
[58] Field of Search .................. 475/168, 180, 475/344; 74/457, 460, 462

[56] References Cited

U.S. PATENT DOCUMENTS

| | | | |
|---|---|---|---|
| 1,694,031 | 12/1928 | Braren | 475/168 |
| 3,946,620 | 3/1976 | Yamamoto et al. | 74/462 |
| 4,050,331 | 9/1977 | Braren | 475/168 |
| 4,552,037 | 11/1985 | Distin, Jr. et al. | |
| 4,909,102 | 3/1990 | Haga | 475/168 |
| 5,368,455 | 11/1994 | Eisenmann | |
| 5,429,556 | 7/1995 | Ishida et al. | 475/180 |

FOREIGN PATENT DOCUMENTS

| | | | |
|---|---|---|---|
| 0086393 | 8/1983 | European Pat. Off. | F16H 1/32 |
| 2-261943 | 10/1990 | Japan | 475/180 |
| 1516959 | 7/1978 | United Kingdom | F16H 1/32 |
| 1531495 | 11/1978 | United Kingdom | F16H 1/32 |
| WO9200473 | 1/1992 | WIPO | F16H 1/32 |

*Primary Examiner*—Charles A. Marmor
*Assistant Examiner*—Sherry Lynn Estremsky
*Attorney, Agent, or Firm*—Lane, Aitken & McCann

[57] ABSTRACT

A planetary gear apparatus comprising an inner tooth gear having an inner peripheral portion formed with a plurality of inner teeth each in the form of a semi-circular cross-section shape and an outer tooth gear positioned within the inner tooth gear and having an outer peripheral portion formed with a plurality of outer teeth each in the form of a wave shape. The outer tooth gear has a center axis offset at an offset amount from the center axis of the inner tooth gear, and revolvable while being held in sliding and meshing contact with the inner tooth gear with the center axis of the outer tooth gear moving on a revolution orbit encircling and spaced from the center axis of the inner tooth gear at a distance equal to the offset amount. The outer teeth of the outer tooth gear have their respective tooth profiles each including deddendum and addendum portions, and a pair of tooth engaging portions each connected at its deddendum side end with the deddendum portion and at its addendum side end with the addendum portion. In the planetary gear apparatus, each of the tooth engaging portions of the tooth profiles has an epitrochoidal tooth surface extending on a theoretical epitrochoid curve having a central point coincident wit the center axis of the outer tooth gear, and the epitrochoidal tooth surfaces of the outer teeth are partly continually held in pressing contact with the inner teeth of the inner tooth gear even under the state that no load torque is applied to the outer tooth gear. The deddendum and addendum portions of the tooth profile of the outer tooth are closer to the center axis of the outer tooth gear than the theoretical epitrochoid cure, thereby making it possible to have the deddendum and addendum portions held out of contact with the inner teeth of the inner tooth gear even under the state that a certain load torque is exerted on the outer tooth gear.

9 Claims, 10 Drawing Sheets

OUTER TOOTH PROFILE OF PLANETARY GEAR APPARATUS

BACKGROUND OF THE INVENTION

1. Field of the Invention

The present invention relates to a planetary gear apparatus provided with an inner tooth gear constituted by a plurality of inner teeth each in the form of a semi-circular cross-section shape and an outer tooth gear constituted by a plurality of outer teeth held in sliding contact and meshing relationship with the inner teeth and each in the form of a wave shape, and in particular to a technology for forming the profiles of the outer teeth of the outer tooth gear.

This type of planetary gear apparatus is high in rigidity as a result of being constructed by a number of inner and outer teeth held in sliding and meshing engagement with one another so that this type of planetary gear apparatus can extensively be employed in reduction gears which are used as those of, such as for example, a robot joint mechanism, a driving mechanism for machine tools, and a traveling mechanism for construction vehicles.

The inner tooth of the inner tooth gear is in general in the form of semi-circular cross-section, thereby making it possible to utilize cylindrical pins for production of the inner tooth gear and thereby facilitating production of the inner tooth gear along with lessened friction resistance acted on the inner and outer teeth of the inner and outer tooth gears.

2. Description of the Prior Art

Conventionally, there have so far been provided a typical type of planetary gear apparatus which comprises an inner tooth gear having a center axis and formed with a plurality of inner teeth, and an outer tooth gear positioned within the inner tooth gear and formed with a plurality of outer teeth held in sliding and meshing contact with the inner teeth of the inner tooth gear. The outer tooth gear has a center axis offset at an offset amount from the center axis of the inner tooth gear and is supported by a casing member through a plurality of crank shafts in such a manner that the outer tooth gear is revolvable around the center axis of the inner tooth gear with the center axis of the outer tooth gear moving on a revolution orbit encircling and spaced from the center axis of the inner tooth gear at a distance equal to the offset amount. The crank shafts each have center rotation axes and crank portions on which the outer tooth gear is rotatably supported so that when the crank shafts are respectively rotated about the center rotation axes, the outer tooth gear is revolved along the revolution orbit by the crank shafts and rotated about the center axis of the outer tooth gear. The rotation and revolution of the outer tooth gear causes one of the inner tooth gear and the casing member to be rotated at a relatively low speed. The number of the outer teeth formed on the outer tooth gear is smaller, in general by only one than that of the inner teeth formed on the inner peripheral portion of the inner tooth gear. This means that the reduction ratio of the planetary gear apparatus is 1/n where "n" represents the number of the inner teeth of the inner tooth gear so that the inner tooth gear is rotated by the crank shafts in sliding and meshing engagement with the outer tooth gear around its center axis at the previous reduction ratio of 1/n.

In the planetary gear apparatus of this type, the outer tooth gear has a wave shape along a predetermined trochoid curve. The tooth gear which is formed based on the trochoid curve is referred to simply as an epitrochoid tooth profile, while the curve which is formed by the tooth surface of the tooth gear is referred to simply as a tooth profile curve.

The prior-art planetary gear apparatus of this type is taught by Japanese publications including Japanese Provisional Patent Publication No. 4-69299 and Japanese Patent Laid-open Publication No. 4-282047.

These conventional planetary gear apparatus are, however, operated with the outer teeth of the outer tooth gear meshing with the inner teeth of the inner tooth gear at a pressure angle markedly large such as in the neighborhood of 90 degrees at the addendum and deddendum portions forming each of the outer teeth of the outer tooth gear. This causes a large tooth weight acted in the normal line with respect to the surface of each of the outer teeth of the outer tooth gear on the outer teeth of the outer tooth gear having a large pressure angle although the portions of the outer teeth of the outer tooth gear requires a small backlash. This results in disadvantageous effects including a relatively large resistance imparted on the inner and outer tooth gears, thereby lessening the starting efficiency of the planetary gear apparatus. Furthermore, the other disadvantageous effects are such that the inner and outer teeth of the inner and outer tooth gears are meshed with each other at a relatively large engaging pressure which in turn generates heat in the teeth of the inner and outer tooth gears. This may draw not only a low load capacity to each of the inner and outer teeth of the inner and outer tooth gears but also damages to the surfaces of the inner and outer teeth of the inner and outer tooth gears. The outer tooth gear has a large pressure angle around the addendum portion of each of the outer teeth as well as an engaging point on each of the inner teeth of the inner tooth gear distant from a pitch point formed by the inner and outer tooth gears. This may also cause a considerably large sliding speed and a large resistance loss, thereby lowering power transmission efficiency of the inner and outer tooth gears.

SUMMARY OF THE INVENTION

It is therefore a primary object of the present invention to provide a planetary gear apparatus which comprises an outer tooth gear having a load capacity balanced in the overall peripheral portion of the outer tooth gear.

It is another object of the present invention to provide a planetary gear apparatus which comprises inner and outer tooth gears meshing with each other in high quality.

It is a further object of the present invention to provide a planetary gear apparatus which is of high starting efficiency by preventing the tooth surface weight and resistance loss of the inner and outer tooth gear from being increased.

It is a still further object of the present invention to provide a planetary gear apparatus which does not draw torque fluctuation and vibrations caused by machining errors as well as lessening the backlash between the tooth surfaces of the inner and outer teeth of the inner and outer tooth gears.

According to one aspect of the present invention, there is provided a planetary gear apparatus comprising an inner tooth gear having a center axis and an inner peripheral portion formed with a plurality of inner teeth each in the form of a semi-circular cross-section shape, and an outer tooth gear positioned within the inner tooth gear and having an outer peripheral portion formed with a plurality of outer teeth each in the form of a wave shape. The inner teeth are circumferentially equally spaced apart from each other and having respective center axes extending in parallel with the center axis of the inner tooth gear, and the number of the outer teeth being decided to be different from that of the inner teeth based on the reduction ratio between the inner and outer tooth gears. The outer tooth gear has a center axis offset at an offset amount from the center axis of the inner tooth gear, and is revolvable around the center axis of the inner tooth gear while being held in sliding and meshing contact with the inner teeth of the inner tooth gear with the center axis of the outer tooth gear moving on a revolution orbit encircling and spaced from the center axis of the inner tooth gear at a distance equal to the offset amount. The outer teeth of the outer tooth gear have their respective tooth profiles each including deddendum and addendum portions; and a pair of tooth engaging portions each connected at its deddendum side end with the deddendum portion and at its addendum side end with the addendum portion. In the planetary gear apparatus, each of the tooth engaging portions of the tooth profiles has an epitrochoidal tooth surface extending on a theoretical epitrochoid curve having a central point in coincident relationship with the center axis of the outer tooth gear, the epitrochoidal tooth surfaces of the outer teeth of the outer tooth gear are held in sliding and meshing contact with the inner teeth of the inner tooth gear, the deddendum portion of the theoretical tooth profile has a deddendum surface closer to the center axis of the outer tooth gear than the theoretical epitrochoid curve, and the addendum portion of the theoretical tooth profile has an addendum surface closer to the center axis of the outer tooth gear than the theoretical epitrochoid curve.

The deddendum surface of the deddendum portion may be spaced away from the theoretical epitrochoid curve with a maximum space at the midcenter of the deddendum surface, and the addendum surface of the addendum portion is preferably spaced away from the theoretical epitrochoid curve with a maximum space at the mid-center of the addendum surfaces.

The inner teeth of the inner tooth gear preferably includes a first aligned inner tooth having a center axis and a tooth engaging surface which is held in the closest relationship with the midcenter of the deddendum surface of the deddendum portion is in when the midcenter of the deddendum surface of the deddendum portion is in alignment with the center axis of the first aligned inner tooth of the inner tooth gear and the center axis of the inner tooth gear, a second aligned inner tooth spaced apart from the addendum portion of one of the outer teeth of the outer tooth gear when the midcenter of the deddendum surface of the deddendum portion is in alignment with the center axis of the first aligned inner tooth of the inner tooth gear and the center axis of the inner tooth gear, a first group of non-aligned inner teeth symmetrically arranged with respect to the first aligned inner tooth and having respective tooth engaging surfaces which are respectively in pressing contact with the epitrochoidal tooth surfaces of the outer teeth of the outer tooth gear when the midcenter of the deddendum surface of the deddendum portion is in alignment with the center axis of the first aligned inner tooth of the inner tooth gear and the center axis of the inner tooth gear, and a second group of non-aligned inner teeth symmetrically arranged with respect to the first aligned inner tooth and respectively spaced apart from the addendum portions of the outer teeth of the outer tooth gear when the midcenter of the deddendum surface of the deddendum portion is in alignment with the center axis of the first aligned inner tooth of the inner tooth gear and the center axis of the inner tooth gear.

Each of the epitrochoidal tooth surfaces of the outer teeth of the outer tooth gear may have a tangential line and an action line perpendicular to the tangential line, the inner and outer teeth of the inner and outer tooth gears are engaged with each other at a surface point where the action line intersects the tangential line, the inner peripheral portion of the inner tooth gear has a circumferential line having the center axes of the inner teeth of the inner tooth gear extend thereon and a tangential line perpendicular to the radial direction of the inner tooth gear, the action line of the outer tooth of the outer tooth gears and the tangential line of the inner tooth of the inner tooth gear defining a pressure angle which is variable between a first maximum pressure angle at which the inner and outer teeth of the inner and outer tooth gears start to be brought into engagement with each other and a second maximum pressure angle at which the inner and outer teeth of the inner and outer tooth gears start to be brought out of engagement with each other, and the pressure angle are in the range of 50 to 80 degrees.

Each of the outer teeth of the outer tooth gear may have a tooth profile factor set at a value below 0.1 or a negative value.

The inner tooth gear has an inner peripheral portion formed with a plurality of pin grooves each in the form of semi-circular cross-section and having a center axis extending in parallel with the center axis of the inner tooth gear, and in which each of the inner teeth of the inner tooth gear is constituted by a cylindrical pin having a lower half portion received in the pin groove of the inner tooth gear and rotatable around its own axis, the cylindrical pin being rotated with respect to the inner tooth gear by each of the outer teeth of the outer tooth gear while the cylindrical pin is held in sliding contact with each of the outer teeth of the outer tooth gear.

BRIEF DESCRIPTION OF THE DRAWINGS

The features and advantages of a planetary gear apparatus in accordance with the present invention will be more clearly understood from the following description taken in conjunction with the accompanying drawings in which.

DESCRIPTION OF THE PREFERRED EMBODIMENTS

Figure 1:
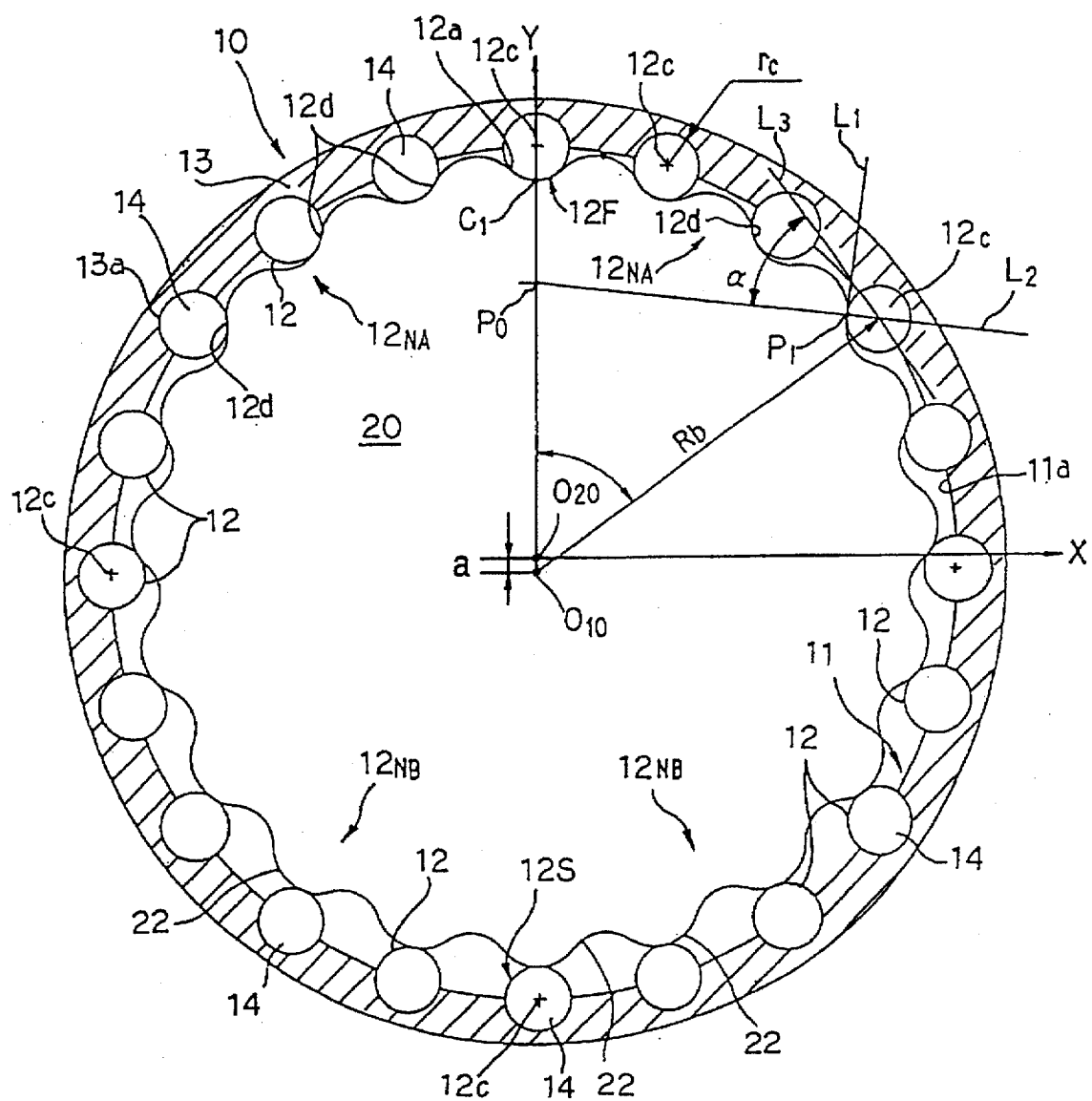
FIG. 1 is a fragmentary cross-sectional view of a first embodiment of a planetary gear apparatus embodying the present invention and shows an outline construction of the first embodiment of the planetary gear apparatus.
Figure 2:
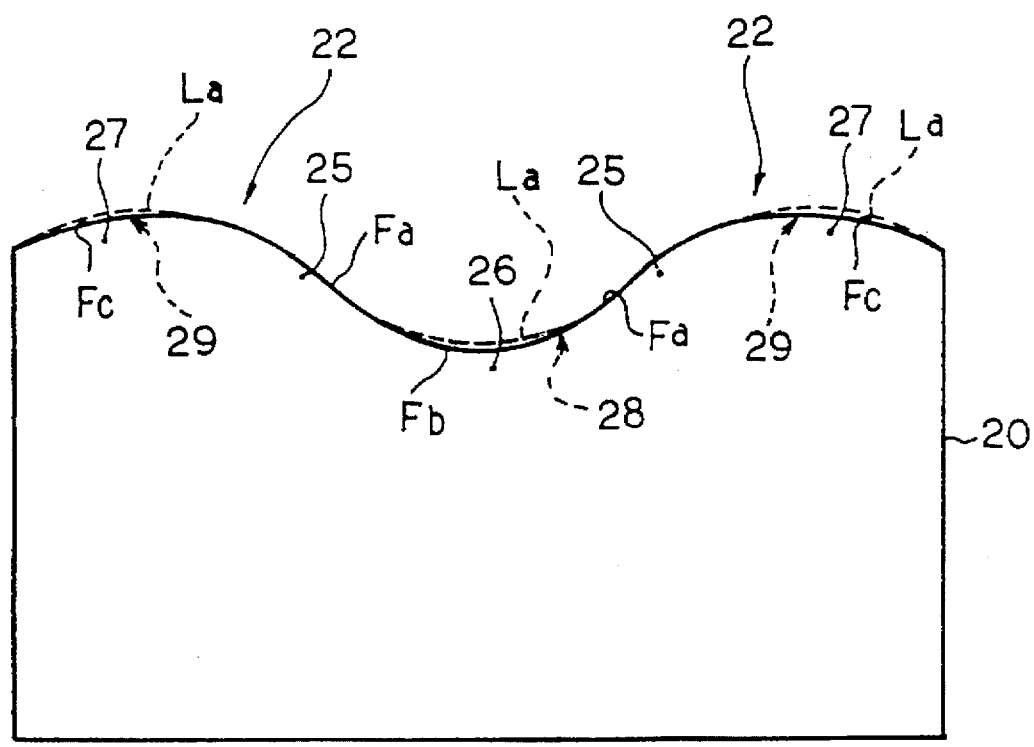
FIG. 2 is an enlarged fragmentary cross-sectional view of a tooth profile drawn from one of the outer teeth of the outer tooth gear in part constituting the first embodiment of the planetary gear apparatus.

Referring to FIGS. 1 and 2 of the drawings, a first embodiment of a planetary gear apparatus according to the present invention is shown as generally comprising an inner tooth gear 10 and an outer tooth gear 20. The inner tooth gear 10 has a center axis $O_{10}$ and an inner peripheral portion 11 formed with a plurality of inner teeth 12 each in the form of a semi-circular cross-section shape having a radius $r_c$. The inner teeth 12 of the inner tooth gear 10 is circumferentially equally spaced apart from one another and have respective center axes 12c extending in parallel with the center axis $O_{10}$ of the inner tooth gear 10.

In FIG. 1, the inner peripheral portion 11 of the tooth gear 10 is constituted by a ring member 13 formed with a plurality of pin grooves 13a, a plurality of cylindrical pins 14 having a lower half portion 14a received in the pin groove 13a of the ring member 13, and a pair of support members each attached to the ring member 13 to have the plurality of pins 14 seated in the pin grooves 13a of the ring member 13, but not shown in the drawings. Each of the pin grooves 13a of the ring member 13 is in the form of semi-circular cross-section which has a predetermined radius almost the same as the radius $r_c$ of each pin 14 and its center axis extending in parallel with the center axis $O_{10}$ of the inner tooth gear 10. The plurality of pins 14 are each supported by the ring member 13 and the support members to be rotatable about their respective center axes, i.e., the center axes 12c of the inner teeth 12.

The planetary gear apparatus further comprises a plurality of crank shafts, not shown in the drawings, by which the outer tooth gear 20 is supported to have a center axis $O_{20}$ of the outer tooth gear 20 offset at an offset amount a from the center axis $O_{10}$ of the inner tooth gear 10. The outer tooth gear 20 has a plurality of cranked through bore portions wherein the crank shafts are respectively rotatably received through respective bearings to be equally spaced from one another as well as from the center axis of the outer tooth gear 20. More specifically, each of the crank shafts has a center rotation axis portion rotatably supported by a casing member to be connected to external driving means, and a crank portion received in the cranked through bore portion of the outer tooth gear 20. The outer tooth gear 20 thus supported by the crank shafts is revolvable around the center axis $O_{10}$ of the inner tooth gear 10 so that the center axis $O_{20}$ of the outer tooth gear 20 moves on a revolution orbit encircling and spaced from the center axis $O_{10}$ of the inner tooth gear 10 at a distance equal to the offset amount $e_o$.

The outer tooth gear 20 has an outer peripheral portion 21 formed with a plurality of outer teeth 22 each in the form of a wave shape. The number of the outer teeth 22 is decided to be smaller, in general by one or two, than that of the inner teeth 12 based on the reduction ratio of the planetary gear apparatus.

In the embodiments of the planetary gear apparatus herein and hereinafter disclosed, the number of the outer teeth formed on the outer tooth gear is designed to be smaller by only one than that of the inner teeth formed on the inner peripheral portion of the inner tooth gear. The reduction ratio of the inner and outer tooth gears 10 and 20 is for example 1/n, where "n" represents the number of the inner teeth 12 of the inner tooth gear 12. The inner tooth gear 10 is rotated by the revolvable outer tooth gear 20 in sliding and meshing engagement with the inner tooth gear 10 when the outer tooth gear 20 is revolved around the center axis $O_{10}$ of the inner tooth gear 10 by the aforesaid crank shafts. During revolution motion of the outer tooth gear 20, the outer teeth 22 of the outer tooth gear 20 are held in sliding and meshing contact with the inner teeth 12 of the inner tooth gear 10, and each of the cylindrical pins 14 is rotated with respect to the ring member 13 of the inner tooth gear 10 by each of the outer teeth 22 of the outer tooth gear 20 while the cylindrical pin 14 is held in sliding contact with each of the outer teeth 22 of the outer tooth gear 20. The planetary gear apparatus may have an output shaft by which the crank shafts are rotatably supported and which is rotatable supported by the aforesaid casing member.

The outer teeth 22 of the outer tooth gear 20 have their respective tooth profiles each of which includes a pair of tooth engaging portions 25, a deddendum portion 26 and an addendum portion 27. Each of the tooth engaging portions 25 is connected at its deddendum side end with the deddendum portion 26 and at its addendum side end with the addendum portion 27.

In FIG. 2, the tooth engaging portions 25 of the tooth profiles of the outer teeth 22 respectively have epitrochoidal tooth surfaces Fa each extending on a theoretical epitrochoid curve La which has a central point in coincident relationship with the center axis $O_{20}$ of the outer tooth gear 20. The theoretical epitrochoid curve La is defined as to be a curve traced by a point on a circular disk which has a certain radius "r" and rolls around a base circle. The base circle has a radius "R" larger than the radius "r" of the circular disk. The epitrochoidal tooth surfaces Fa of the outer teeth 22 of the outer tooth gear 20 are held in sliding and meshing contact with the inner teeth 12 of the inner tooth gear 10.

On the other hand, the deddendum portion 26 has a deddendum surface Fb spaced apart from the theoretical epitrochoid curve La with a crescent deddendum space 28 gradually increasing from the deddendum side end of the tooth engaging portion 25 toward the midcenter of the deddendum surface Fb of the deddendum portion 26 as shown in FIG. 2. For similar reason, the addendum portion 27 has an addendum surface Fc spaced apart from the theoretical epitrochoid curve La with a crescent addendum space 29 gradually increasing from the addendum side end of the tooth engaging portion 25 toward the midcenter of the addendum surface Fc of the addendum portion 27.

While it has been described in the foregoing description that the deddendum and addendum portions 26 and 27 are respectively formed with the crescent deddendum and addendum spaces 28 and 29, the crescent deddendum and addendum spaces 28 and 29 are not essential but the deddendum and addendum spaces 28, 29 can take any form according to the present invention. Similarly, the deddendum surface Fb of the deddendum portion 26 may be spaced away from the theoretical epitrochoid curve La with a maximum space at the midcenter of the deddendum surface Fb, and the addendum surface Fc of the addendum portion 27 may be spaced away from the theoretical epitrochoid curve La with a maximum space at the midcenter of the addendum surface 27 in accordance with the present invention.

In FIG. 1, the inner teeth 12 of the inner tooth gear 10 includes a first aligned inner tooth 12F having a tooth engaging surface 12a and a center axis 12c, and a second aligned inner tooth 12S spaced apart from the addendum portion 27 of one of the outer teeth 22 of the outer tooth gear 20 when the midcenter of the deddendum surface Fb of the deddendum portion 26 is in alignment with the center axis 12c of the first aligned inner tooth 12F of the inner tooth gear 10 and the center axis $O_{10}$ of the inner tooth gear 10. The tooth engaging surface 12a of the first aligned inner tooth 12F is held in the closest relationship with the midcenter $C_1$ of the deddendum surface Fb of the deddendum portion 26 among the peripheral surfaces of the outer teeth 22 when the midcenter $C_1$ of the deddendum surface Fb of the deddendum portion 26 is held in alignment with the center axis 12c of the first aligned inner tooth 12F of the inner tooth gear 10 and the center axis $O_{10}$ of the inner tooth gear 10.

Figure 3:
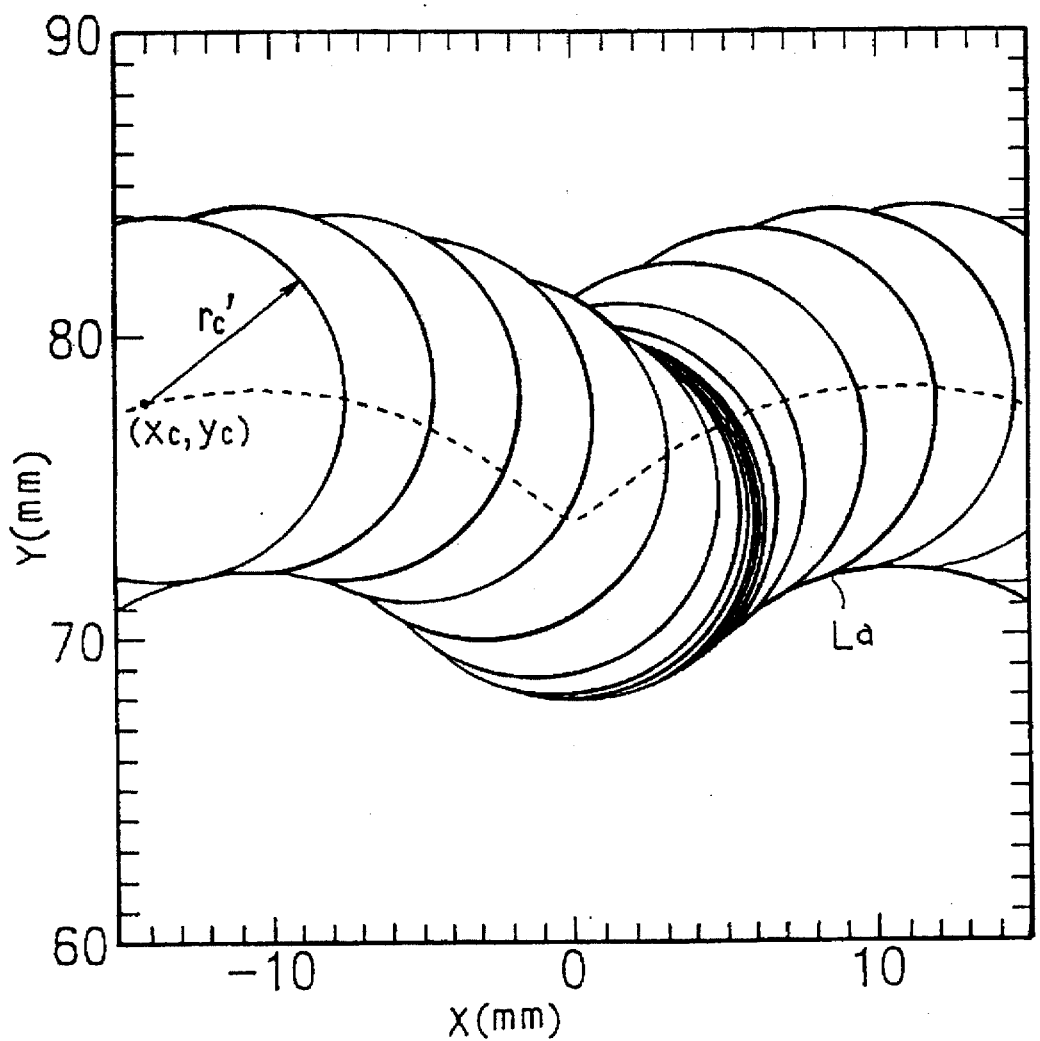
FIG. 3 is an ideal tooth profile curve to be used for forming the tooth engaging portion of each of the outer teeth of the outer tooth gear in part constituting the first embodiment of the planetary gear apparatus.

The inner teeth 12 of the inner tooth gear 10 further includes a first group of non-aligned inner teeth 12NA symmetrically arranged with respect to the first aligned inner tooth 12F and having respective tooth engaging surfaces 12d, and a second group of non-aligned inner teeth 12NB symmetrically arranged with respect to the first and second aligned inner teeth 12F, 12S. The tooth engaging surfaces 12d of the non-aligned inner teeth 12NA are respectively held in pressing contact with the tooth engaging surfaces Fa of the tooth engaging portions 25 of the outer teeth 22 when the midcenter $C_1$ of the deddendum surface Fb of the deddendum portion 26 is in alignment with the center axis 12c of the first aligned inner tooth 12F of the inner tooth gear 10 and the center axis $O_{10}$ of the inner tooth gear 10. To keep the pressing contact between the tooth engaging surfaces 12d of the non-aligned inner teeth 12NA and the tooth engaging surfaces Fa of the tooth engaging portions 25, each of the pins 14 forming part of the inner tooth gear 10 may have a radius $r_c$ larger than that of a theoretical radius $r_c'$ by which the theoretical epitrochoid curve La is defined as shown in FIG. 3. The tooth profile of the outer tooth 22 may have a tooth engaging surface Fa outwardly offset to extend along the theoretical epitrochoid curve La with a profile offset amount below than 10 μm. The number of the first group of non-aligned inner teeth 12NA, which is varied with the form of each of the tooth engaging surfaces Fa of the tooth engaging portions 25. The second group of non-aligned inner teeth 12NB are respectively spaced apart from the addendum portions 27 of the outer teeth 22 of the outer tooth gear 20 when the midcenter $C_1$ of the deddendum surface Fb of the deddendum portion 26 is in alignment with the center axis 12c of the first aligned inner tooth 12F of the inner tooth gear 10 and the center axis $O_{10}$ of the inner tooth gear 10. There is no clearance between the tooth engaging surface Fa of each of the outer teeth 22 and each of the first group of non-aligned inner teeth 12NA, although there may be a difference in the contact pressure between the first group of non-aligned inner teeth 12NA due to for example a predetermined tolerable tooth profile error of the outer tooth gear 20.

Each of the tooth engaging surfaces Fa of the outer teeth 22 of the outer tooth gear 20 has a tangential line $L_1$ and an action line $L_2$ perpendicular to the tangential line $L_1$. The action line $L_2$ is defined by a pitch point $P_0$ and each of the center axes 12c of the inner teeth 12. The inner and outer teeth 12, 22 of the inner and outer tooth gears 10, 20 are engaged with each other at a surface point $P_1$ where the action line $L_2$ intersects the tangential line $L_1$.

The inner peripheral portion 11 of the inner tooth gear 10 has a circumferential line 11a having the center axes 12c of the inner teeth 12 extend thereon and a tangential line $L_3$ perpendicular to the radial direction of the inner tooth gear 10. The action line $L_2$ of the outer tooth 22 of the outer tooth gear 20 and the tangential line $L_3$ of the inner peripheral portion 11 of the inner tooth gear 10 define a variable pressure angle α which is variable between a first maximum pressure angle at which the inner and outer teeth 12, 22 of the inner and outer tooth gears 10, 20 start to be brought into engagement with each other and a second maximum pressure angle at which the inner and outer teeth 12, 22 of the inner and outer tooth gears 10, 20 are brought out of engagement with each other. According to the present invention, it is preferable that the pressure angle α be in the range of 50 to 80 degrees. In the case that the pressure angle α is set at 50 degrees, the above first group of non-aligned inner teeth 12NA are each side arranged within an obtuse angle range of approximately 100 degrees. In the case that the pressure angle α is set at 80 degrees, the above first group of non-aligned inner teeth 12NA are each side arranged within an acute angle range.

Figure 4:
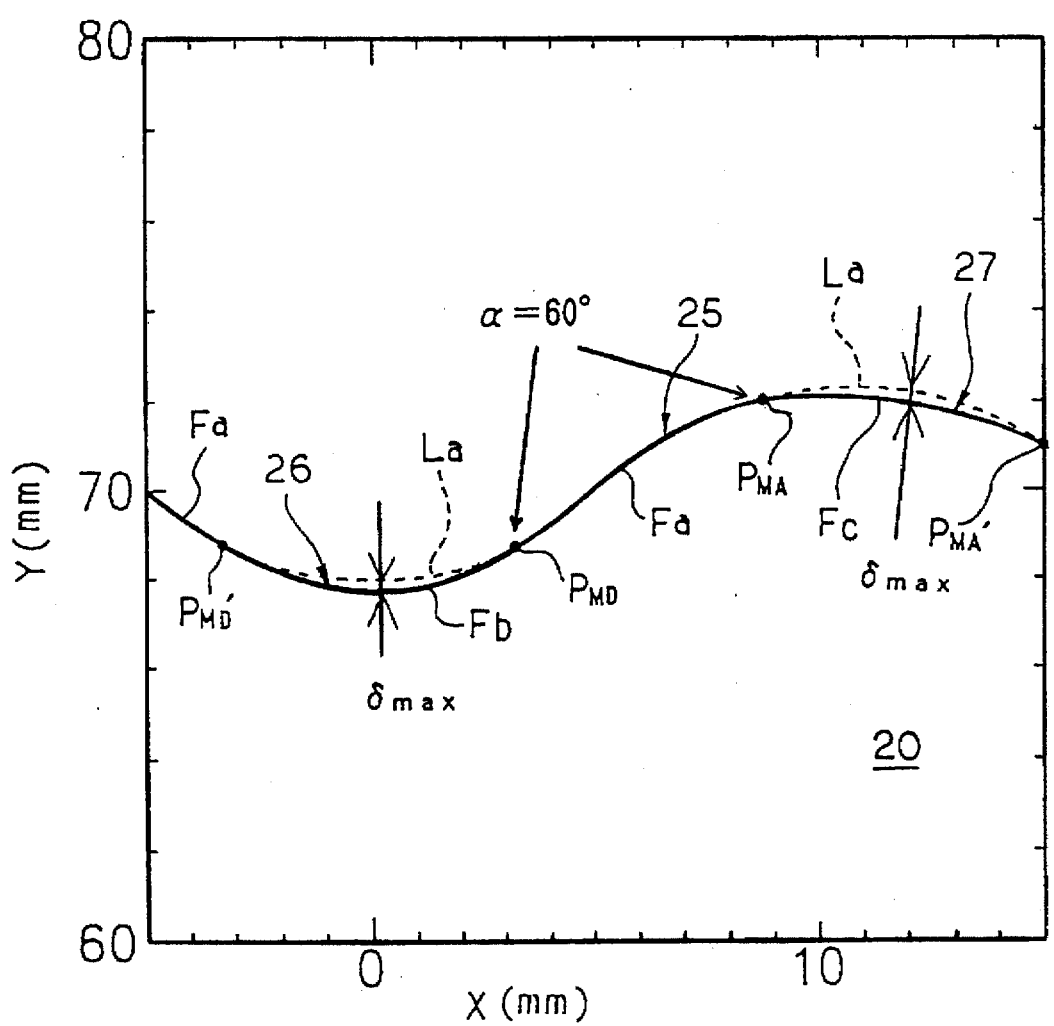
FIG. 4 is an explanatory view of each of the outer teeth of the first embodiment and shows cut-off portions of each of the outer teeth.

As shown in FIGS. 3 and 4, each of the tooth engaging portions 25 has a tooth profile formed by the loci of circles each having a central point (xc, yc) represented by a dotted line and a radius $r_c$, while the deddendum and addendum portions 26 and 27 of the outer teeth 22 have respective tooth surfaces Fb and Fc each of which is moved to and designated by a solid line drawn inwardly of the theoretical epitrochoid curve La represented by a dotted line in FIG. 4. Each of the tooth engaging surfaces Fa of the tooth engaging portions 25 has a maximum pressure angle position PMD adjacent to the deddendum surface Fb of the deddendum portion 26 and a maximum pressure angle position PMA adjacent to the addendum surface Fa of the addendum portion 27 so that the tooth engaging surface Fa of the tooth engaging portion 25 is designed to be brought into pressing engagement with the inner teeth 12 of the inner tooth gear 10 between the maximum pressure angle position PMD adjacent to the deddendum portion 26 and the maximum pressure angle position PMA adjacent to the addendum portion 27 at a pressure angle α lower than the maximum pressure angle. The maximum pressure angle α is set at a specific value such as for example 60 degrees which is in the range of 50 to 80 degrees. The maximum pressure angles α adjacent to the addendum and deddendum portions may be set at different values, respectively.

In FIG. 4, The cut-off amount of the deddendum and addendum portions 26, 27 are respectively set to assume a maximum value δ max at the middle of the maximum pressure angle positions PMD, PMD' adjacent to each other or at the middle of maximum pressure angle positions PMA, PMA' adjacent to each other, The cut-off amount δ is set to assume zero at each of the maximum pressure angle positions PMD, PMD' and at each of the maximum pressure angle positions PMA, PMA'. The maximum cut-off amount δ max is equal to the addition of eccentric tolerances of the inner and outer tooth gears 10 and 20, which is measured at the tight and loose sides in meshing of the inner and outer teeth 12 and 22, or somewhat larger than the addition of eccentric tolerances of the inner and outer tooth gears 10 and 20. This cut-off amount means that the outer teeth 22 is by no means to be brought into pressing engagement with the inner teeth 12 of the inner tooth gear 10 at the deddendum and addendum portions 26 and 27.

The tooth coordinate (X, Y) of the outer teeth 22 shown in FIG. 1 is represented by the following equations (1a) and (1b) if the pitch circle radius passing through the center rotation axes 12c of the inner teeth 12 is Rb, a reduction ratio from the revolution of the crank shaft to the rotation of the outer tooth gear 20 with respect to the inner tooth gear 10 is $1/(-Z_I+1)$, and the tooth number difference between the inner tooth gear 10 and outer tooth gear 20 is set at $n_d$.

$$X = X_o + r_c \cdot \cos\beta \qquad (1a)$$

$$Y = Y_o + r_c \cdot \sin\beta \qquad (1b)$$

where $X_o$ denotes $R_b \cdot \sin(\phi/Z_d) - a \cdot \sin(Z_I \cdot \phi/Z_d)$;

$Y_o$ denotes $R_b \cdot \cos(\phi/Z_d) - a \cdot \cos(Z_I \cdot \phi/Z_d)$;

$\cos \beta$ represents $\{k \cdot \sin(Z_I \cdot \phi/Z_d) - \sin(\phi/Z_d)\}/\sqrt{(1+k^2-2k\cos\phi)}$;

$\sin \beta$ represents $\{k \cdot \sin(Z_I \cdot \phi/Z_d) + \cos(\phi/Z_d)\}/\sqrt{(1+k^2-2k\cos\phi)}$;

k indicates $Z_I \cdot a/R_b = 1 - X_T$; and $Z_d$ denotes $Z_I - 1$.

The tooth number of the inner tooth gear 10 is $n_d \times Z_I$, and the tooth number of the outer tooth gear 20 is $n_d \times Z_d$. With the angle $\phi$ being varied in the range of 0 to 180 degrees, the tooth profile curve of each of the outer teeth 22 is formed from its deddendum portion 26 corresponding to the angle $\phi = 0°$ to its addendum portion 27 corresponding to the angle $\phi = 180°$. The above tooth number difference should usually be set at 1 or 2.

The tooth surfaces Fb and Fc of the deddendum and addendum portions 26 and 27 of the outer teeth 22 can selectively be designed if the tooth surfaces Fb and Fc are positioned inwardly of the theoretical epitrochoid curve La and not brought into engagement with the inner teeth 12 of the inner tooth gear 10. The deddendum and addendum surfaces Fb, Fc of the deddendum and addendum portions 26 and 27 may be partly brought into contact with the inner teeth 12 of the inner tooth gear 10 at a pressure raised to such an extent that there is no torque transmitted between the inner and outer teeth 12,22 of the inner and outer tooth gears 10,20.

The operation of the planetary gear apparatus will be described hereinlater.

Initially, the outer tooth gear 20 is driven by the driving means to revolve around the center axis $O_{10}$ of the inner tooth gear 10 and to move on the revolution orbit. At this time, the first group of non-aligned inner teeth 12NA of the inner tooth gear 10 are pressurized by the outer teeth 22 of the outer tooth gear 20, and each of the tooth engaging portions 25 of the outer teeth 22 is brought into pressing engagement with the inner teeth 12 of the inner tooth gear 10 at a meshing pressure angle $\alpha$. The meshing pressure angle $\alpha$ can always be controlled below the predetermined maximum pressure angle, for example the angle of 60 degrees, because the epitrochoidal tooth surface Fa of each of the tooth engaging portions 25 starts to be brought into pressing engagement with the inner teeth 12 at the maximum pressure angle position $P_{MA}$ and departs from the inner teeth 12 at the maximum pressure angle position $P_{MD}$.

The outer tooth gear 20 is then stopped at a certain position on the revolution orbit. At this time, even if no load torque is applied to the inner tooth gear 10 or the outer tooth gear 20, the first group of non-aligned inner teeth 12NA are still pressurized by the outer teeth 22 of the outer tooth gear 20.

It is therefore understood that the engaging portions 25 of the outer teeth 22 are brought into pressing engagement with the first group of non-aligned inner teeth 12NA even when no load torque is given to the inner and outer tooth gears 10, 20 and that the deddendum and addendum portions 26, 27 of the outer teeth 22, however, are always out of pressing engagement with the inner teeth 12 of the inner tooth gear 10.

This results in the fact that there is no excessive engaging pressure acted on the deddendum and addendum portions 26 and 27 as well as no excessive friction resistance generated between the inner and outer teeth 12 and 22, thereby overcoming drawbacks caused on the conventional planetary gear apparatus which may limit the bearing capacity of the apparatus itself resulting from the bearing capacity of the deddendum and addendum portions. In addition, there is no backlash between the first group of non-aligned inner teeth 12NA of the inner tooth gear 10 and the outer teeth 22 of the outer tooth gear 20, thereby making it possible to output precisely reduced rotation when the outer tooth gear 20 is revolved within the inner tooth gear 10 and to precisely maintain the relative rotational position of the outer tooth gear 20 with respect to the inner tooth gear 10 with high rigidity.

The planetary gear apparatus according to the present invention is therefore distinct and different from the conventional planetary gear apparatus in which the inner teeth of the inner tooth gear and the outer teeth of the outer tooth gear are spaced from each other with a predetermined clearance, i.e., a backlash between the tooth surfaces of the inner and outer teeth of the inner and outer tooth gears when no load torque is applied to its output member.

By the reason that the cut-off amount of the deddendum portion 26 or the addendum portion 27 with respect to the theoretical epitrochoid tooth profile is set to assume a maximum value $\delta$ max at the middle of the maximum pressure angle positions $P_{MD}$, $P_{MD}'$ adjacent to each other or at the middle of maximum pressure angle positions $P_{MA}$, $P_{MA}'$ adjacent to each other while the cut-off amount is set to assume zero at each of the maximum pressure angle positions $P_{MD}$, $P_{MD}'$, $P_{MA}$ and $P_{MA}'$, the overall tooth profile of the outer teeth 22 can have a balanced bearing capacity. This means that the meshing between the inner teeth 12 of the inner tooth gear 10 and the outer teeth 22 of the outer tooth gear 20 is enhanced in quality.

Moreover, it is extremely easy to machine and partly cut-off the tooth profile of the outer tooth gear originally having and that the maximum pressure angle positions $P_{MD}$, $P_{MD}'$ and $P_{MA}$, $P_{MA}'$ can easily be decided to be located at the opposite ends of the tooth engaging portion 25. As a consequence, it is possible that the surface weight and the friction loss are decreased to prevent the reduction ratio efficiency of the planetary gear apparatus from being lowered. Even if the tooth engaging portion 25 of the outer teeth 22 is designed to have a measurement for reducing a backlash between the inner and outer teeth 12 and 22, there is no excessive surface pressure between the deddendum and addendum portions 26 and 27, thereby making it possible to reduce torque fluctuation and vibrations caused by machine errors as well as to lessen the backlash between the inner and outer teeth 12 and 22.

Figure 5:
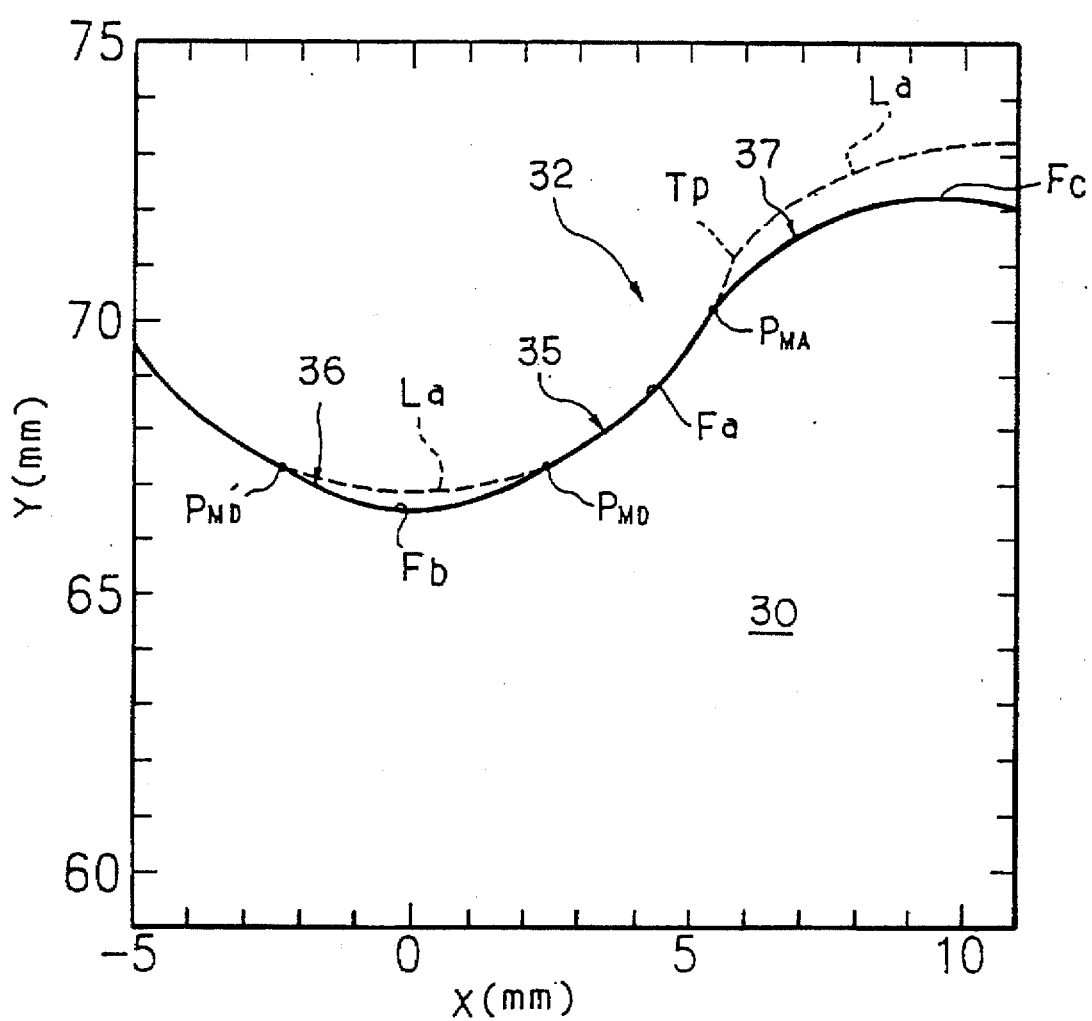
FIG. 5 is an enlarged essential part view of the second embodiment of the planetary gear apparatus according to the present invention.
Figure 6:
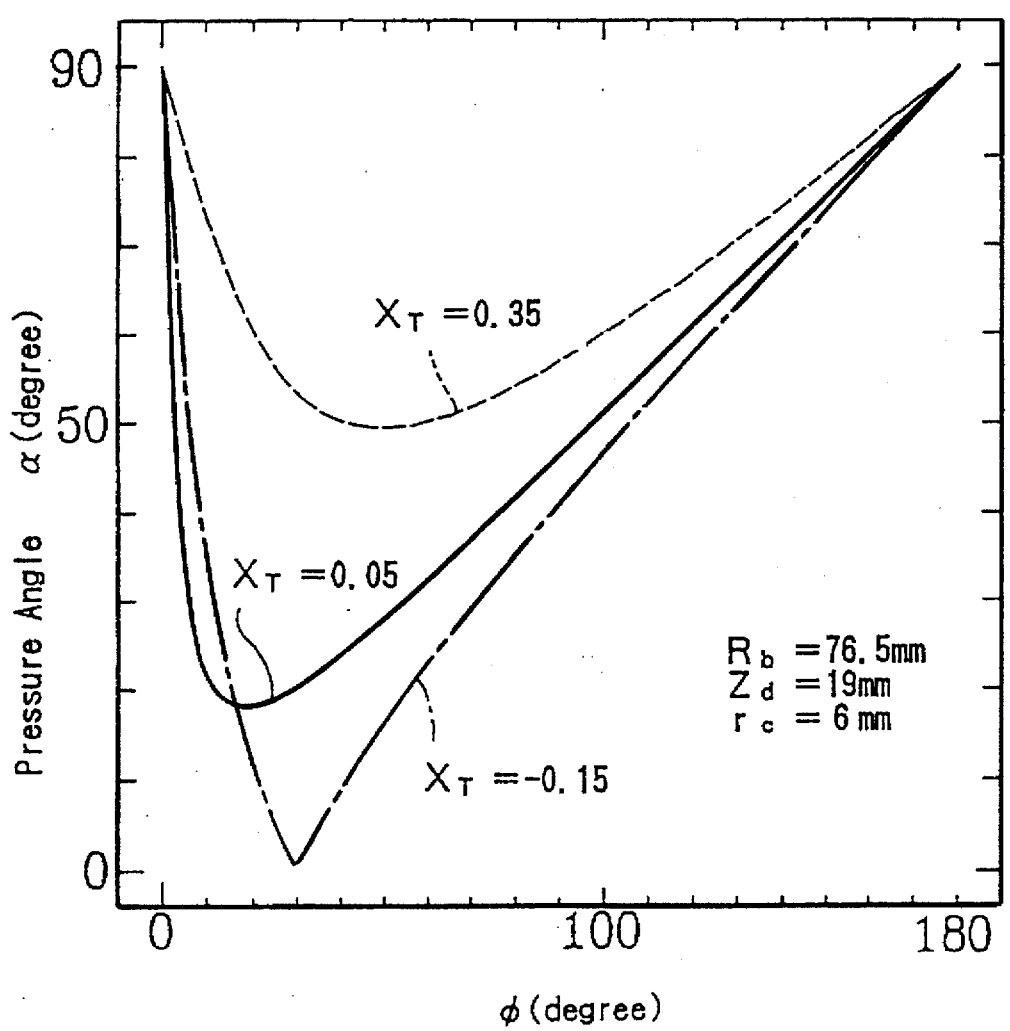
FIG. 6 is a view for explaining the variation of the pressure angles based on the tooth profile coefficient.

FIGS. 5 and 6 show the second embodiment of the planetary gear apparatus in accordance with the present invention. The present embodiment is different from the first embodiment in tooth profile of the outer teeth. FIG. 5 shows the different tooth engaging portion 35 of the outer teeth designated at different numerals while other parts the same as those of the first embodiment will be described with the reference numerals same as those of the first embodiment.

In FIG. 5, the outer tooth gear 30 has an outer peripheral portion 31 formed with a plurality of outer teeth 32. The tooth number of the outer teeth 32 of the outer tooth gear 30 is somewhat different from, e.g., smaller than the tooth number of the inner teeth 12 of the inner tooth gear 10 as will be understood from an example in which the tooth number $N_{32}$ of the outer teeth 32 of the outer tooth gear 30 is set at 19 with respect to the tooth number $N_{12}=20$ of the inner teeth 12 of the inner tooth gear 10.

Each of the outer teeth 32 of the outer tooth gear 30 is constituted by a tooth engaging portion 35 extending along a theoretical epitrochoid curve La and brought into pressing engagement with one of the first group of non-aligned inner teeth 12NA of the inner tooth gear 10, a deddendum portion 36 having a tooth surface Fb positioned inwardly of the theoretical epitrochoid curve La of the tooth engaging portion 35 of the outer tooth 31, and an addendum portion 37 having tooth surface Fc positioned inwardly of a theoretical epitrochoid curve La of the tooth engaging portion 35 of the outer tooth 32.

The tooth engaging portion 35 of each of the outer teeth 32 is formed with an epitrochoid tooth profile which has a tooth profile factor $X_T(=1-Z_I\times a/R_b)$ set at a value below 0.1, for example at 0.05. The deddendum and addendum portions 36 and 37 of the outer teeth 32 are shown in FIG. 5 to be cut off with the respective tooth surfaces Fb and Fc positioned inwardly of the theoretical epitrochoid curve La of the tooth engaging portion 35 of the outer tooth 32 as will be seen from solid lines. In this case, the pressure angle $\alpha$ is represented by a solid line shown in FIG. 6 and is varied in response to the angle $\phi$. The cut-off amount is set to assume a maximum value at the middle of the maximum pressure angle positions $P_{MD}$, $P_{MD}'$ adjacent to each other or at the middle of maximum pressure angle positions $P_{MA}$ adjacent to each other, while the cut-off amount is set to assume zero at the maximum pressure angle positions $P_{MD}$, $P_{MD}'$ and at the maximum pressure angle positions $P_{MA}$. The maximum cut-off amount is equal to the addition of eccentric tolerances of the inner and outer tooth gears 10 and 30 or somewhat larger than the addition of eccentric tolerances of the inner and outer tooth gears 10 and 30. This cut-off amount means that the outer teeth 31 is by no means to be brought into pressing engagement with the inner teeth 12 of the inner tooth gear 10 at the deddendum and addendum portions 36 and 37. The radius $r_c$ of the arcuate tooth profile of each of the inner teeth 12 is set for example at 6 mm.

It will be understood from the foregoing description that the present embodiment of the planetary gear apparatus thus constructed in the above is designed to have the tooth engaging portion 35 brought into pressing engagement with the inner teeth 12 of the inner tooth gear 10, however, to have the deddendum and addendum portions 36 and 37 of the outer teeth 21 out of pressing engagement with the inner teeth 12 of the inner tooth gear 10. This leads that there is no excessive engaging pressure acted on the deddendum and addendum portions 36 and 37 as well as no excessive friction resistance generated between the inner and outer teeth 12 and 31, thereby overcoming drawbacks caused on the conventional planetary gear apparatus.

By the reason that the cut-off amount is set to assume a maximum value at the middle of the maximum pressure angle positions $P_{MD}$, $P_{MD}'$ adjacent to each other or at the middle of maximum pressure angle positions $P_{MA}$ adjacent to each other, while the cut-off amount is set to assume zero at each of the maximum pressure angle positions $P_{MD}$, $P_{MD}'$ and $P_{MA}$, the overall tooth profile of the outer teeth 32 can have a balanced bearing capacity. The meshing between the inner teeth 12 of the inner tooth gear 10 and the outer teeth 31 of the outer tooth gear 30 is therefore enhanced in quality.

As the tooth engaging portion 35 of each of the outer teeth 31 is formed with a theoretical epitrochoid tooth profile which has a tooth profile factor $X_T(=1-Z_I\times a/R_b)$ set at a value below 0.1, the difference between the radius of curvature of the tooth engaging portion 35 of the outer teeth 32 and the tooth surface radius $r_c$ of the inner tooth 12 of the inner tooth gear 10 comes to be lessened, thereby extremely increasing comprehensive radius of curvature of the tooth engaging portion 35 while decreasing the maximum pressure angle. The tooth engaging stress, i.e., hertz stress at an arbitrary point selected within the tooth engaging portion 35 of the outer tooth 31 can be drastically decreased, thereby making it possible to enhance the bearing capacity of the tooth surface of each of the outer teeth 31. The tooth profile factor $X_T$ is set at 0.05 in the present embodiment so that there will be decreased the inner and outer teeth which are meshing with each other while the hertz stress is below ½ as compared with the hertz stress procured by the conventional tooth profile having a tooth profile factor $X_T$ set at 0.15 to 0.5. This means that the bearing capacity of the tooth engaging portion 35 of the tooth 31 can be increased to two times the bearing capacity of the tooth engaging portion of the conventional tooth. This makes it possible to remarkably enhance the bearing capacity and efficiency of the planetary gear apparatus.

Figure 7:
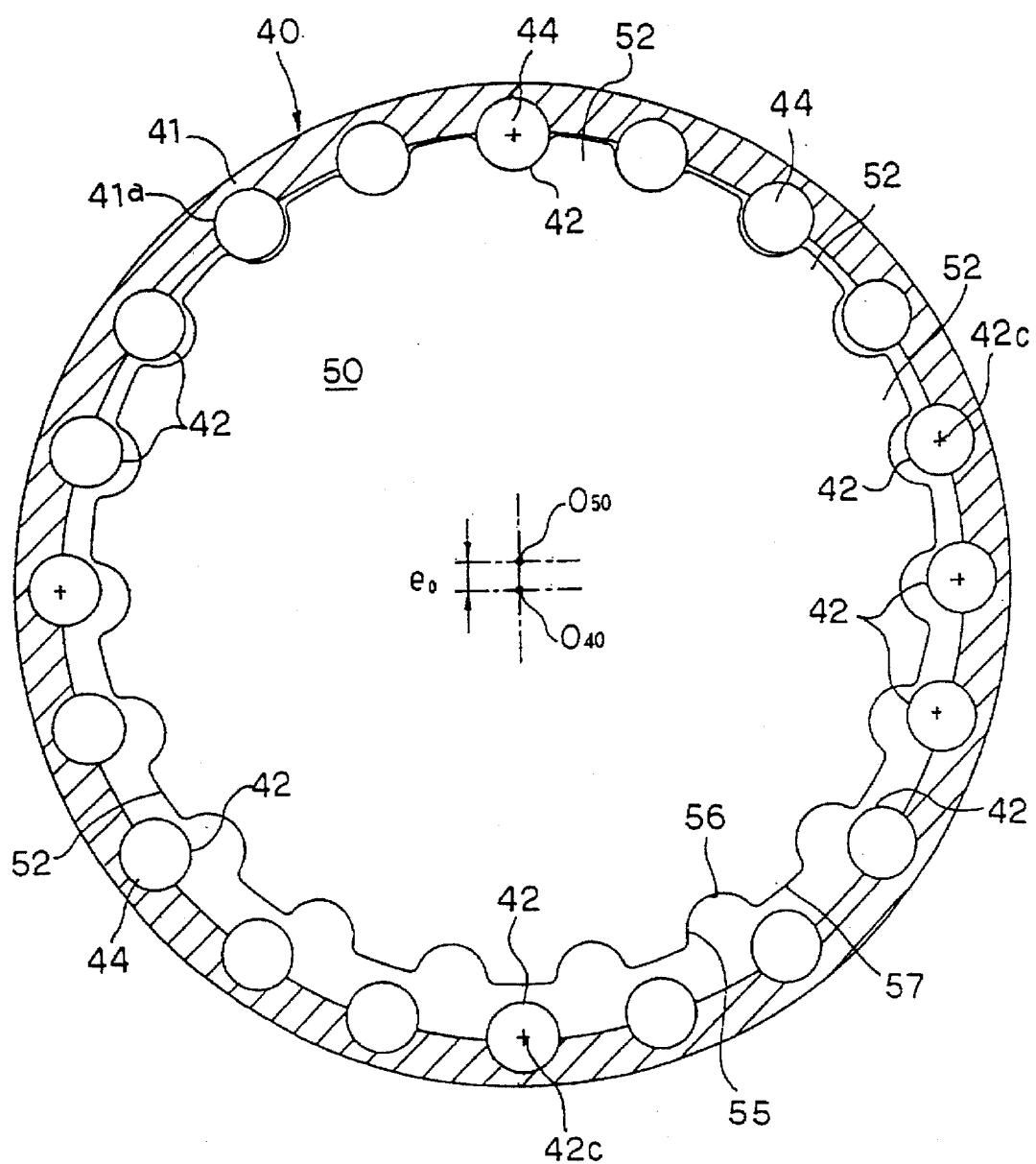
FIG. 7 is a fragmentary cross-sectional view similar to FIG. 1 but showing the third embodiment of a planetary gear apparatus embodying the present invention.
Figure 8:
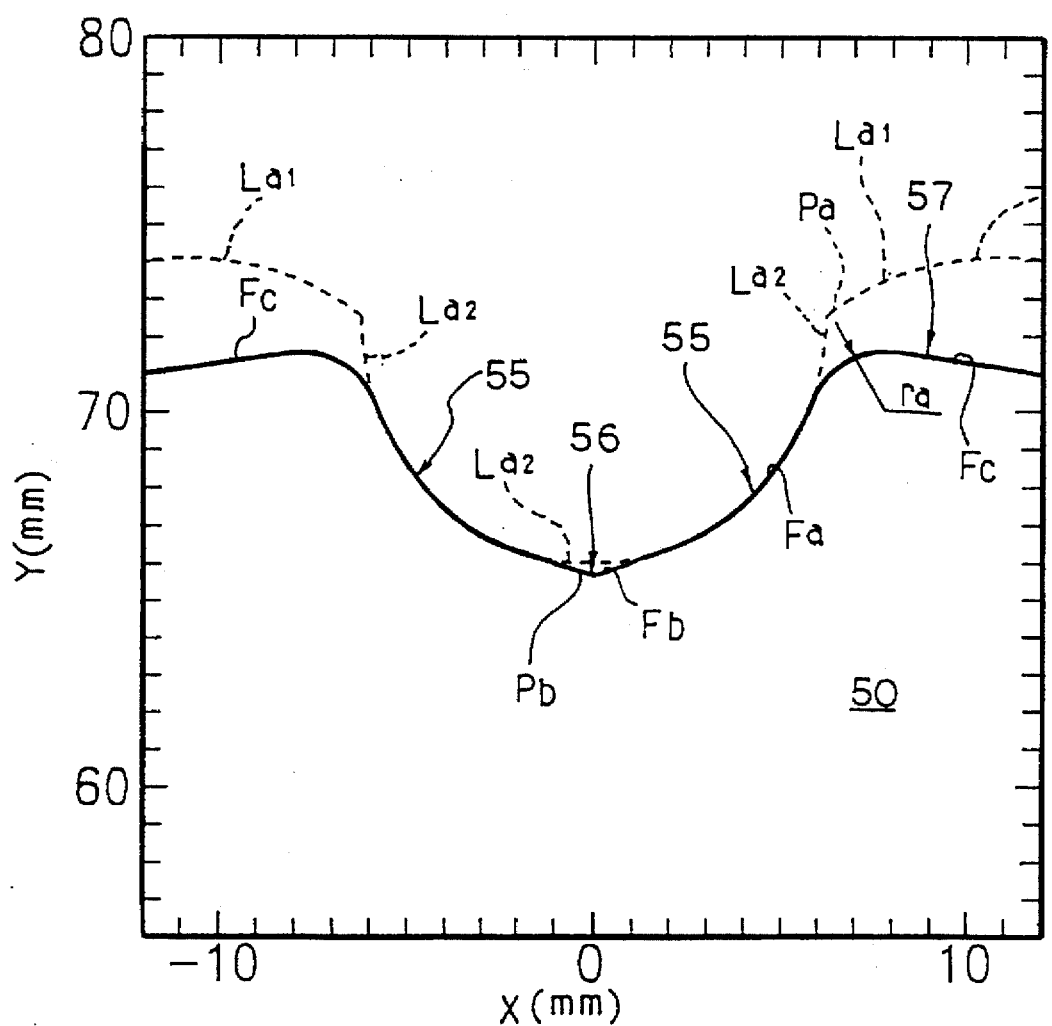
FIG. 8 is an enlarged fragmentary view of the tooth profile of each of the outer teeth of the outer tooth gear in the third embodiment of the planetary gear apparatus according to the present invention.
Figure 9:
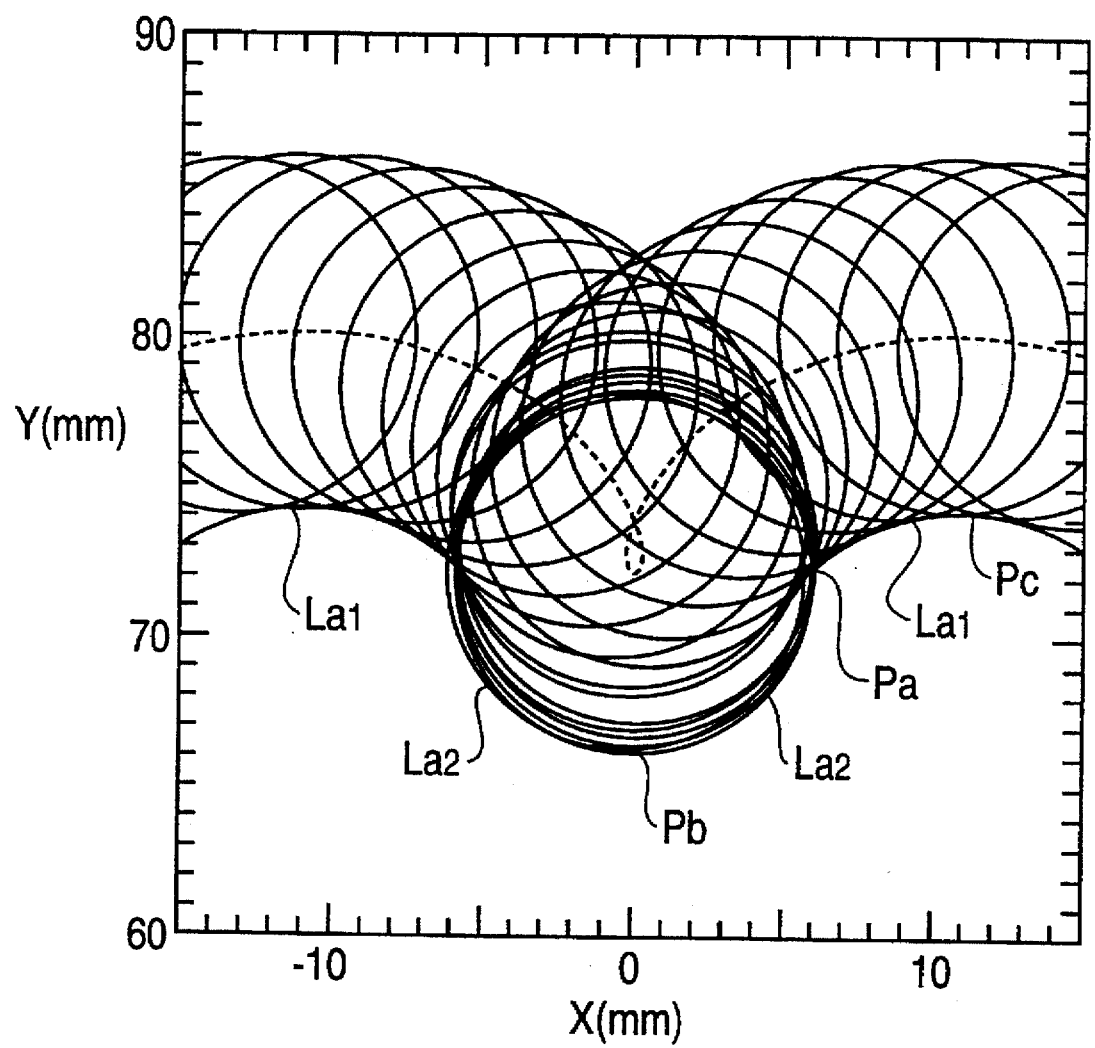
FIG. 9 is a view similar to FIG. 3 but showing an ideal tooth profile curve for forming the tooth engaging portion of each of the outer teeth of the outer tooth gear in the third embodiment.

FIGS. 7 to 9 show the third embodiment of the planetary gear apparatus in accordance with the present invention.

In FIG. 7, the reference numeral 40 indicates an annular inner tooth gear formed with the inner peripheral portion of an annular body 41 and having a plurality of inner teeth 42 in the form of arcuate tooth profile. Each of the inner teeth 42 is constituted by a cylindrical pin 44 received in an arcuate groove 41a formed in the annular body 41. The reference numeral 50 indicates an outer tooth gear which has a plurality of outer teeth 52 meshing with the inner teeth 42 of the inner tooth gear 40 and in the form of a wave shape. The outer teeth 52 of the outer tooth gear 50 has a tooth number somewhat smaller than the tooth number of the inner teeth 42 of the inner tooth gear 40. The outer tooth gear 50 is supported by a plurality of crank shafts in a similar manner to the outer tooth gear 20 which is described with respect to the first embodiment of the present invention. The crank shafts are designed to revolve the outer tooth gear 50 within the inner tooth gear 40 with a predetermined offset amount a equivalent to the distance between the center rotation axis $O_{40}$ of the inner tooth gear 40 and the center rotation axis $O_{50}$ of the outer tooth gear 50. The fundamental operation of the third embodiment is carded out similarly to that of the first embodiment, with the result that the difference of the tooth number between both the inner and outer tooth gears 40 and 50 causes one of the inner and outer tooth gears 40 and 50, i.e., movable side tooth gear, to be rotated at a low speed with respect to the other of the inner and outer tooth gears 40 and 50, i.e., stationary side tooth gear.

On the other hand, each of the outer teeth 52 of the outer tooth gear 50 is shown in FIG. 8 as comprising a tooth engaging portion 55 which is to be brought into pressing engagement with the inner teeth 42 of the inner tooth gear 40, a deddendum portion 56 having tooth surface Fb positioned inwardly of a theoretical epitrochoid curve La of the tooth engaging portion 55 of the outer tooth 51, and an addendum portion 57 having a tooth surface Fc positioned inwardly of the theoretical epitrochoid curve La of the tooth engaging portion 55 of the outer tooth 51.

The tooth engaging portion 55 of each of the outer teeth 52 is formed with an epitrochoid tooth profile which has a tooth profile factor $X_T$ set at a negative value, for example at −0.15. In the case of the tooth profile factor $X_T$ set at a negative value, the theoretical epitrochoid tooth profile is shown in FIG. 9 as comprising two different curves consisting of an inner envelope $La_1$ in the vicinity of the addendum portion 57 and an outer envelop $La_2$ in the vicinity of the deddendum portion 56. More specifically, the tooth profile curve form the point Pa of intersection of the inner envelop $La_1$ and the outer envelop $La_2$ to the peak Pc of the inner envelop $La_1$ is same as the conventional tooth profile curve. The tooth coordinate (X, Y) of the outer envelop $La_2$ in the vicinity of the deddendum portion 56 is represented by the tooth profile curve as given by the following equation (2a),(2b) if the pitch circle radius passing through the center rotation axes 42c of the inner teeth 42 is $R_b$, a reduction ratio from the revolution of the crank shaft to the rotation of the outer tooth gear 50 is $1/(-Z_I+1)$, and the tooth number difference between the inner tooth gear 40 and outer tooth gear 50 is set at $n_d$.

$$X = X_o - r_c \cdot \cos \beta \quad (2a)$$

$$Y = Y_o + r_c \cdot \sin \beta \quad (2a)$$

where $X_o$ denotes $R_b \cdot \sin(\emptyset/Z_d) - a \cdot \sin(Z_I \cdot \emptyset/Z_d)$;

$Y_o$ denotes $R_b \cdot \cos(\emptyset/Z_d) - a \cdot \cos(Z_I \cdot \emptyset/Z_d)$;

$\cos \beta$ represents $\{k \cdot \sin(Z_I \cdot \emptyset/Z_d) - \sin(\emptyset/Z_d)\} / \sqrt{(1+k^2-2k \cos \emptyset)}$;

$\sin \beta$ represents $\{k \cdot \sin(Z_I \cdot \emptyset/Z_d) + \cos(\emptyset/Z_d)\} / \sqrt{(1+k^2-2k \cos \emptyset)}$;

$k$ indicates $Z_I \cdot a/R_b = 1-XT$; and $Z_d$ denotes $Z_I-1$.

The present embodiment is designed to have each of tooth profiles formed as shown in solid lines in FIG. 8 on the basis of an ideal tooth profile represented by these two locus curves. More specifically, the tooth surfaces Fa of the contacting portions 55 of the teeth 52 are respectively formed on the ideal tooth curve $La_1$ and $La_2$ as shown in dotted lines in FIG. 8, while the tooth surfaces Fb and Fc of the deddendum and addendum portions 56 and 57 are formed inwardly of the ideal tooth profile $La_1$ and $La_2$, viz., from the ideal tooth profile $La_1$ and $La_2$ toward the center rotation axis $O_{50}$ of the outer tooth gear 50. The junction portion formed in the vicinity of the junction Pa of the ideal tooth profile by the tooth surface Fa of the tooth engaging portion 55 of each of the teeth 52 and the tooth surface Fc of the addendum portion 57 is curved at a predetermined radius $r_a$ so that the inner teeth 42 of the inner tooth gear 40 can smoothly become in meshing relationship with the outer teeth 52 of the outer tooth gear 50.

The present embodiment thus constructed in the above can extremely decrease the hertz stress in the tooth engaging portion 55 of the each of the outer teeth 52 for the same reason as in the second embodiment, and can lessen the whole tooth surface weight accompanied with the decrease of the pressure angle. Moreover, the present embodiment can diminish the sliding speed at the meshing point of the inner and outer teeth. This makes it possible to drastically enhance not only the bearing capacity but also the power transmission efficiency of the plenary gear apparatus. The computer simulation test conducted by the inventors reveals that the power transmission efficiency of the planetary gear apparatus in accordance with the present invention was enhanced by about 10 percentage over that of the conventional planetary gear apparatus. If the driving torque of the planetary gear apparatus in accordance with the present invention is same as that of the conventional planetary gear while they are under their idling operations, the backlash between the inner and outer teeth can be reduced by 20 percentage, thereby making it possible to improve the vibration characteristics and to bring about smooth operation to the inner and outer tooth gears.

The known planetary gear apparatus having a planetary gear formed with a epitrochoid tooth profile is required to have pins or rollers rotatable around their own axes with respect to the inner tooth gear for the purpose of securing a certain level of efficiency, however, the planetary gear apparatus in accordance with the present invention does not need such pins or rollers as used in the conventional planetary gear apparatus.

Figure 10:
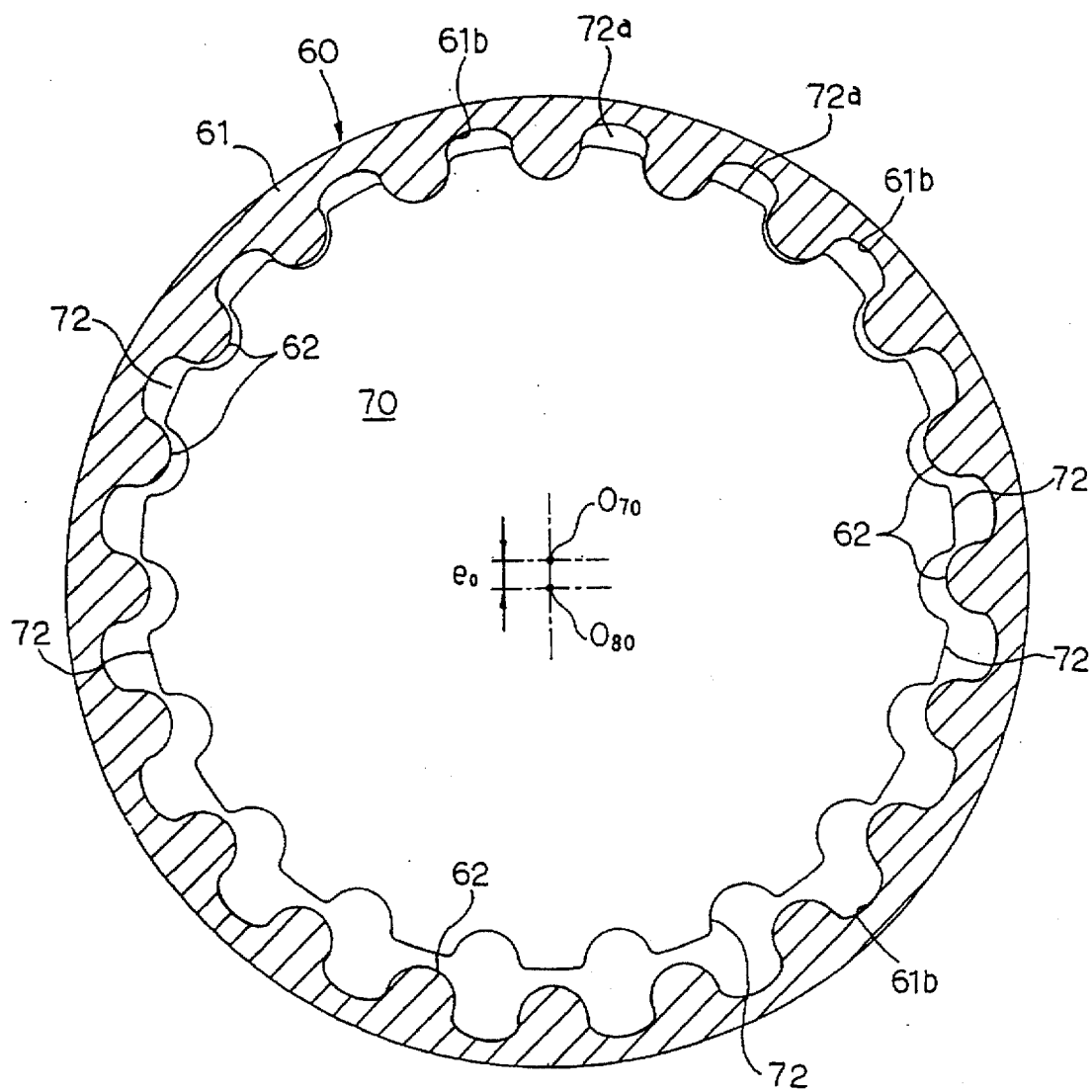
FIG. 10 is a fragmentary cross-sectional view similar to FIG. 1 but showing a fourth embodiment of the planetary gear apparatus according to the present invention.

FIG. 10 shows a fourth embodiment of the planetary gear apparatus in accordance with the present invention which is exemplified as having no pins or rollers.

The present embodiment of the planetary gear apparatus is constituted partly by an annular body 61, and an inner tooth gear 60 integrally formed with the annular body 61 to have a plurality of inner teeth 62. The inner tooth gear 60 is adapted to be meshed with an outer tooth gear 70 having a plurality of outer teeth 72 The outer tooth gear 70 may be constructed in a manner similar to the outer tooth gear of any one of the first to third embodiments such as for example the third embodiment. The inner surface 61b between the inner teeth 62 of the annular body 61 is spaced at a certain gap from the outer surface 72a of the outer tooth gear 70. The end portions of each of the inner teeth should be curved to have a certain radius of curvature.

As stated above, the planetary gear apparatus in accordance with the present invention is constructed in the above so that the deddendum and addendum portions of each of the outer teeth of the outer tooth gear can be brought out of engagement with the inner teeth of the inner tooth gear, thereby making it possible to preventing the tooth surface pressures of the deddendum and addendum portions from being increased as well as to prevent the friction resistance of the inner and outer teeth from being increased. This makes it possible to make even the bearing capacity of the tooth engaging portion of each of the outer teeth and to enhance the meshing of the inner and outer teeth in quality. As a consequence, the planetary gear apparatus in accordance with the present invention can prevent the operation efficiency resulting from the increase of the tooth surface weight and the friction loss caused in the tooth gears. Moreover, the torque fluctuation and vibration from the machine errors of the inner and outer tooth gears can be avoided, and the backlash between the inner and outer teeth can be reduced at a minimum level. In addition, the tooth engaging portion of the outer tooth is engaged with the inner teeth of the inner tooth gear at a pressure angle lower than the maximum pressure angle so that both ends of the tooth engaging portion of the outer tooth can easily be decided, thereby rendering it possible to facilitate machining and cutting-off operations of the tooth profiles of the outer tooth gear.

According to the present invention, the planetary gear apparatus is provided with the outer tooth gear which has a tooth profile factor set at a value below 0.1 so that the difference between the radius of curvature of the deddendum portion of the outer tooth and the tooth surface radius of the inner tooth can be lessened and the pressure angle is decreased. Therefore, the hertz stress is decreased, and the bearing capacity and the efficiency are enhanced even if there is small number of the inner and outer teeth. In the case that the planetary gear apparatus is provided with the outer tooth gear which has a tooth profile coefficient set at a negative value, the difference between the radius of curvature of the deddendum portion of the outer tooth and the tooth surface radius of the inner tooth can be lessened, and the pressure angle is decreased. Therefore, the hertz stress is decreased, and the bearing capacity and the efficiency are enhanced even if there is small number of the inner and outer teeth.

It will be understood by those skilled in the art that the foregoing description is in terms of preferred embodiments of the present invention wherein various modifications are possible within the scope of the apended claims.

What is claimed is:

1. A planetary gear apparatus, comprising:

an inner tooth gear having a center axis and an inner peripheral portion formed with a plurality of inner teeth each in the form of a semi-circular cross-section shape, said inner teeth circumferentially equally spaced apart from each other and having respective center axes extending in parallel with said center axis of said inner tooth gear; and an outer tooth gear positioned within said inner tooth gear and having an outer peripheral portion formed with a plurality of outer teeth each in the form of a wave shape, the number of said outer teeth being different from that of said inner teeth and based on the reduction ratio between said inner and outer tooth gears;

said outer tooth gear having a center axis offset at an offset amount from said center axis of said inner tooth gear, said outer tooth gear being revolvable around said center axis of said inner tooth gear while said outer teeth of said outer tooth gear is held in sliding and meshing contact with said inner teeth of said inner tooth gear with said center axis of said outer tooth gear moving on a revolution orbit encircling and spaced from said center axis of said inner tooth gear at a distance equal to said offset amount, said outer teeth of said outer tooth gear having their respective tooth profiles each including deddendum and addendum portions, and a pair of tooth engaging portions each connected at its deddendum side end with said deddendum portion and at its addendum side end with said addendum portion, in which each of said tooth engaging portions of said tooth profiles has an epitrochoidal tooth surface extending on a theoretical epitrochoid curve having a central point in coincident relationship with said center axis of said outer tooth gear and having the deddendum and addendum portions, said epitrochoidal tooth surfaces of said outer teeth of said outer tooth gear being held in sliding and meshing contact with said inner teeth of said inner tooth gear, said deddendum portion of said tooth profile has a deddendum surface closer to said center axis of said outer tooth gear than said deddendum portion of said theoretical epitrochoid curve, and said addendum portion of said tooth profile has an addendum surface closer to said center axis of said outer tooth gear than said addendum portion of said theoretical epitrochoid curve, and in which said inner teeth of said inner tooth gear includes:

an aligned inner tooth having a center axis and a tooth engaging surface which is held in the closest relationship with the midcenter of said deddendum surface of said deddendum portion when said midcenter of said deddendum surface of said deddendum portion is in alignment with said center axis of said aligned inner tooth of said inner tooth gear and said center axis of said inner tooth gear, and a group of non-aligned inner teeth symmetrically arranged with respect to said aligned inner tooth and said center axis of said inner tooth gear, and having respective tooth engaging surfaces which are respectively in pressing contact with said epitrochoidal tooth surfaces of said tooth engaging portions of said outer teeth when said midcenter of said deddendum surface of said deddendum portion is in alignment with said center axis of said aligned inner tooth and said center axis of said inner tooth gear, said non-aligned inner teeth being in pressing contact with said tooth engaging portions of the outer teeth even when no load torque is given to said inner and outer tooth gears.

2. A planetary gear apparatus as set forth in claim 1, in which each of said epitrochoidal tooth surfaces of said outer teeth of said outer tooth gear has a tangential line and an action line perpendicular to said tangential line, said inner and outer teeth of said inner and outer tooth gears are engaged with each other at a surface point where said action line intersects said tangential line, said inner peripheral portion of said inner tooth gear has a circumferential line having said center axes of said inner teeth of said inner tooth gear extend thereon and a tangential line perpendicular to said radial direction of said inner tooth gear, said action line of said outer tooth of said outer tooth gears and said tangential line of said inner tooth of said inner tooth gear defining a pressure angle which is variable between a first maximum pressure angle at which said inner and outer teeth of said inner and outer tooth gears start to be brought into engagement with each other and a second maximum pressure angle at which said inner and outer teeth of said inner and outer tooth gears start to be brought out of engagement with each other, and said pressure angles are in the range of 50 to 80 degrees.

3. A planetary gear apparatus as set forth in claim 1, in which said outer tooth gear has a tooth profile factor $X_T = 1 - Z_I \cdot a / R_b$, where:

$Z_I$ = the number of the inner teeth/$n_d$, $n_d$ = the difference between the numbers of the inner and outer teeth, a = offset amount of the center axis of the outer tooth gear from the center axis of the inner tooth gear, $R_b$ = radius of the pitch circle passing through the center axes of the inner teeth.

4. A planetary gear apparatus as set forth in claim 3, in which said tooth profile factor $X_T$ of said outer tooth gear is set at a negative value.

5. A planetary gear apparatus as set forth in claim 1, in which said inner tooth gear has an inner peripheral portion formed with a plurality of pin grooves each in the form of semi-circular cross-section and having a center axis extending in parallel with said center axis of said inner tooth gear, and in which each of said inner teeth of said inner tooth gear is constituted by a cylindrical pin having a lower half portion received in said pin groove of said inner tooth gear and rotatable around its own axis, said cylindrical pin being rotated with respect to said inner tooth gear by each of said outer teeth of said outer tooth gear while said cylindrical pin is held in sliding contact with each of said outer teeth of said outer tooth gear.

6. A planetary gear apparatus as set forth in claim 1, in which said deddendum surface of said deddendum portion is spaced away from said theoretical epitrochoid curve with a maximum space at the midcenter of said deddendum surface, and said addendum surface of said addendum portion is spaced away from said theoretical epitrochoid curve with a maximum space at the midcenter of said addendum surfaces.

7. A planetary gear apparatus as set forth in claim 1, in which said deddendum surface of said deddendum portion is spaced apart from said theoretical epitrochoid curve with a crescent deddendum space gradually increasing from said deddendum side end of said tooth engaging portion toward the midcenter of said deddendum surface of said deddendum portion, and said addendum surface of said addendum portion are spaced apart from said theoretical epitrochoid curve with a crescent addendum space gradually increasing from said addendum side end of said tooth engaging portion toward the midcenter of said addendum surface of said addendum portion.

8. A planetary gear apparatus as set forth in claim 1, in which said theoretical epitrochoid curve is traced by a point on a circular disk which has a certain radius and rolls around a base circle having a radius larger than the radius of the circular disk and a central point in coincident relationship with said center axis of said outer tooth gear.

9. A planetary gear apparatus as set forth in claim 1, which the tooth profile of the tooth engaging portions is defined as follows:

$$X = X_o + r_c \cdot \cos \beta$$

$$Y = Y_o + r_c \cdot \sin \beta$$

where $X_o = R_b \cdot \sin(\phi/Z_d) - a \cdot \sin(Z_I \cdot \phi/Z_d)$;

$Y_o = R_b \cdot \cos(\phi/Z_d) - a \cdot \cos(Z_I \cdot \phi/Z_d)$;

$\cos \beta = \{k \cdot \sin(Z_I \cdot \phi/Z_d) - \sin(\phi/Z_d)\}/\sqrt{(1+k^2 - 2k \cdot \cos \phi)}$;

$\sin \beta = \{k \cdot \sin(Z_I \cdot \phi/Z_d) + \cos(\phi/Z_d)\}/\sqrt{(1+k^2 - 2k \cdot \cos \phi)}$;

$k = Z_I \cdot a/R_b = 1 - X_T$;

$Z_I$ = the number of the inner teeth/$n_d$, $Z_d$ = the number of the outer teeth/$n_d$, $n_d$ = the difference between the numbers of the inner and outer teeth, a = offset amount of center axis of the outer tooth gear from the center axis of the inner tooth gear, $R_b$ = radius of pitch circle passing through the center axes of the inner teeth, $r_c$ = radius of the inner tooth, $\phi$ = angle varied in the range from 0 degree to 180 degrees.

* * * * *